(12) United States Patent
Yokota et al.

(10) Patent No.: US 7,155,906 B2
(45) Date of Patent: Jan. 2, 2007

(54) POWER STEERING SYSTEM

(75) Inventors: Tadaharu Yokota, Kanagawa (JP); Jun Soeda, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 9 days.

(21) Appl. No.: 11/073,525

(22) Filed: Mar. 8, 2005

(65) Prior Publication Data
US 2005/0193727 A1 Sep. 8, 2005

(30) Foreign Application Priority Data
Mar. 8, 2004 (JP) .............................. 2004-063287

(51) Int. Cl.
*B62D 5/06* (2006.01)
*B62D 5/30* (2006.01)
(52) U.S. Cl. .......................................... 60/403; 60/468
(58) Field of Classification Search ................. 60/468, 60/473, 476, 494, 403; 180/421, 422
See application file for complete search history.

(56) References Cited

U.S. PATENT DOCUMENTS 6,152,254 A * 11/2000 Phillips ...................... 180/421
6,283,243 B1 * 9/2001 Bohner et al. ............... 180/421
6,513,620 B1 * 2/2003 Igawa et al. ................. 180/421
6,647,721 B1 * 11/2003 Heyne et al. .................. 60/468

FOREIGN PATENT DOCUMENTS

JP        2002-145087 A        5/2002
JP         2002145087 A    *   5/2002

* cited by examiner

Primary Examiner—Thomas E. Lazo
(74) Attorney, Agent, or Firm—Sughrue Mion, PLLC

(57) ABSTRACT

In a hydraulic power steering system employing a power cylinder accommodating therein a piston connected to a steering mechanism for steering assistance, and having first and second hydraulic chambers defined on both sides of the piston, hydraulic pressure is supplied through first and second fluid lines to the respective hydraulic chambers. A communicating circuit is provided to intercommunicate the first and second fluid lines therevia. A directional control valve, disposed in the communicating circuit, has a poppet valve mechanism, which is switched to a valve-open position in presence of a hydraulic power steering system failure, to intercommunicate the first and second fluid lines with the poppet valve mechanism opened.

22 Claims, 4 Drawing Sheets

HYDRAULIC PRESSURE P

COIL ENERGIZATION/ DEENERGIZATION Fs

1ST POPPET

2ND POPPET

POWER STEERING SYSTEM

TECHNICAL FIELD

The present invention relates to a power steering system for automotive vehicles, and specifically to a hydraulic power steering system with a motor-driven reversible pump and a hydraulic power cylinder accommodating therein a piston so that a steering assistance force is produced by directing working fluid flow from the pump to one or the other end of the piston when a steering wheel is turned.

BACKGROUND ART

In recent years, there have been proposed and developed various electronically-controlled power steering systems each employing a reversible pump and a hydraulic power cylinder to provide steering assistance. One such hydraulic power steering system has been disclosed in Japanese Patent Provisional Publication No. 2002-145087 (hereinafter is referred to as "JP2002-145087"), assigned to the assignee of the present invention. In the hydraulic power steering system disclosed in JP2002-145087, downstream ends of a pair of hydraulic-pressure lines are respectively connected to left and right pressure chambers defined on both sides of a piston slidably accommodated in a hydraulic power cylinder. On the other hand, the upstream ends of the two hydraulic-pressure lines are connected to respective discharge ports of a reversible pump. The resulting pressure differential applied to the two sides of the piston, produces a steering assistance force. The magnitude and sense of the steering assistance force are determined based on the magnitude and sense of the steering torque applied to a steering wheel by the driver. Also provided is a communication passage or a bypass passage through which the two hydraulic-pressure lines, that is, the left and right pressure chambers, are intercommunicated with each other, when at least one of the reversible pump and the motor both incorporated in the power steering system is failed. A directional control valve (a shut-off valve), such as a two-position, spring-offset, two-way spool valve, is disposed in the communication passage, to block fluid communication between the two hydraulic-pressure lines via the communication passage during normal steering operation. On the contrary, in presence of a power steering system failure, such as a reversible pump failure or a motor failure, the directional control valve is shifted to its open position for fail-safe purposes, so as to permit full fluid-communication between the two hydraulic-pressure lines via the communication passage so that the power cylinder is held in the free state and does not produce an assisting force, and that a manual steering mode is ensured.

However, as a directional control valve, the power steering system disclosed in JP2002-145087 uses a single solenoid-actuated two-port two-position spool valve. There is a problem of oil leakage from a slight clearance space defined between the outer periphery of each land machined to slide in a very close-fitting bore of the spool valve body and the inner periphery of the bore, that is, the difficulty of ensuring a desired fluid-tight seal performance of the directional control valve, in other words, an undesirable drop of the steering assistance force from a desired value in the power steering mode. Additionally, there is a possibility of the spool sticking due to contamination or debris. With the spool stuck in the closed position, it is impossible to realize the manual steering mode in presence of the power steering system failure. From the viewpoint of reduced oil leakages and contamination and enhanced reliability of the hydraulic power steering system, the more enhanced fluid-tight seal performance and the more reliable operation of the directional control valve would be desirable.

SUMMARY OF THE INVENTION

Accordingly, it is an object of the invention to provide an improved hydraulic power steering system with a directional control valve that ensures a desirable high fluid-tight seal performance for avoidance of an undesirable change in a steering assistance force produced in a normal power steering mode, and that enables smooth switching from the normal power steering mode to a manual steering mode in presence of a power steering system failure.

In order to accomplish the aforementioned and other objects of the present invention, a hydraulic power steering system comprises a steering mechanism adapted to be connected to steered road wheels, a hydraulic power cylinder accommodating therein a piston connected to the steering mechanism for steering assistance, and having first and second hydraulic chambers defined on both sides of the piston, a reversible pump having a pair of discharge ports, a first fluid line intercommunicating the first hydraulic chamber and a first one of the discharge ports of the pump, a second fluid line intercommunicating the second hydraulic chamber and the second discharge port, a torque sensor that detects a steering torque applied to the steering mechanism, a motor that drives the pump, a motor control circuit that controls the motor responsively to a command signal determined based on the steering torque detected, a communicating circuit through which the first and second fluid lines are communicated with each other, a directional control valve disposed in the communicating circuit and having a poppet valve mechanism, and a valve control circuit that opens the directional control valve in presence of a hydraulic power steering system failure including at least one of a motor failure and a reversible pump failure, to intercommunicate the first and second fluid lines with the directional control valve opened.

According to another aspect of the invention, a hydraulic power steering system comprises a steering mechanism adapted to be connected to steered road wheels, a hydraulic power cylinder accommodating therein a piston connected to the steering mechanism for steering assistance, and having first and second hydraulic chambers defined on both sides of the piston, a reversible pump having a pair of discharge ports, a first fluid line intercommunicating the first hydraulic chamber and a first one of the discharge ports of the pump, a second fluid line intercommunicating the second hydraulic chamber and the second discharge port, a motor that drives the pump, a motor control circuit that controls the motor, a communicating circuit through which the first and second fluid lines are communicated with each other, a directional control valve disposed in the communicating circuit, and having a poppet valve mechanism and an electromagnetic solenoid unit connected to the poppet valve mechanism, and a valve control circuit that outputs a valve-opening signal to the solenoid unit for operating the directional control valve in a direction of opening of the directional control valve in presence of a hydraulic power steering system failure including at least one of a motor failure and a reversible pump failure.

According to a further aspect of the invention, a hydraulic power steering system comprises a steering mechanism adapted to be connected to steered road wheels, a hydraulic power cylinder accommodating therein a piston connected to the steering mechanism for steering assistance, and having first and second hydraulic chambers defined on both sides of the piston, a reversible pump having a pair of discharge ports, a first fluid line intercommunicating the first hydraulic chamber and a first one of the discharge ports of the pump, a second fluid line intercommunicating the second hydraulic chamber and the second discharge port, sensor means for detecting a steering torque applied to the steering mechanism, a motor that drives the pump, motor control means for controlling the motor responsively to a command signal determined based on the steering torque detected, a communicating circuit through which the first and second fluid lines are communicated with each other, directional control valve means disposed in the communicating circuit and having at least a poppet valve mechanism, and valve control means for holding the poppet valve mechanism unseated and opened in presence of a hydraulic power steering system failure including at least one of a motor failure and a reversible pump failure, to establish fluid communication between the first and second fluid lines, and for holding the poppet valve mechanism seated and closed in absence of the hydraulic power steering system failure, to block fluid communication between the first and second fluid lines.

The other objects and features of this invention will become understood from the following description with reference to the accompanying drawings.

DESCRIPTION OF THE PREFERRED EMBODIMENTS

Figure 1:
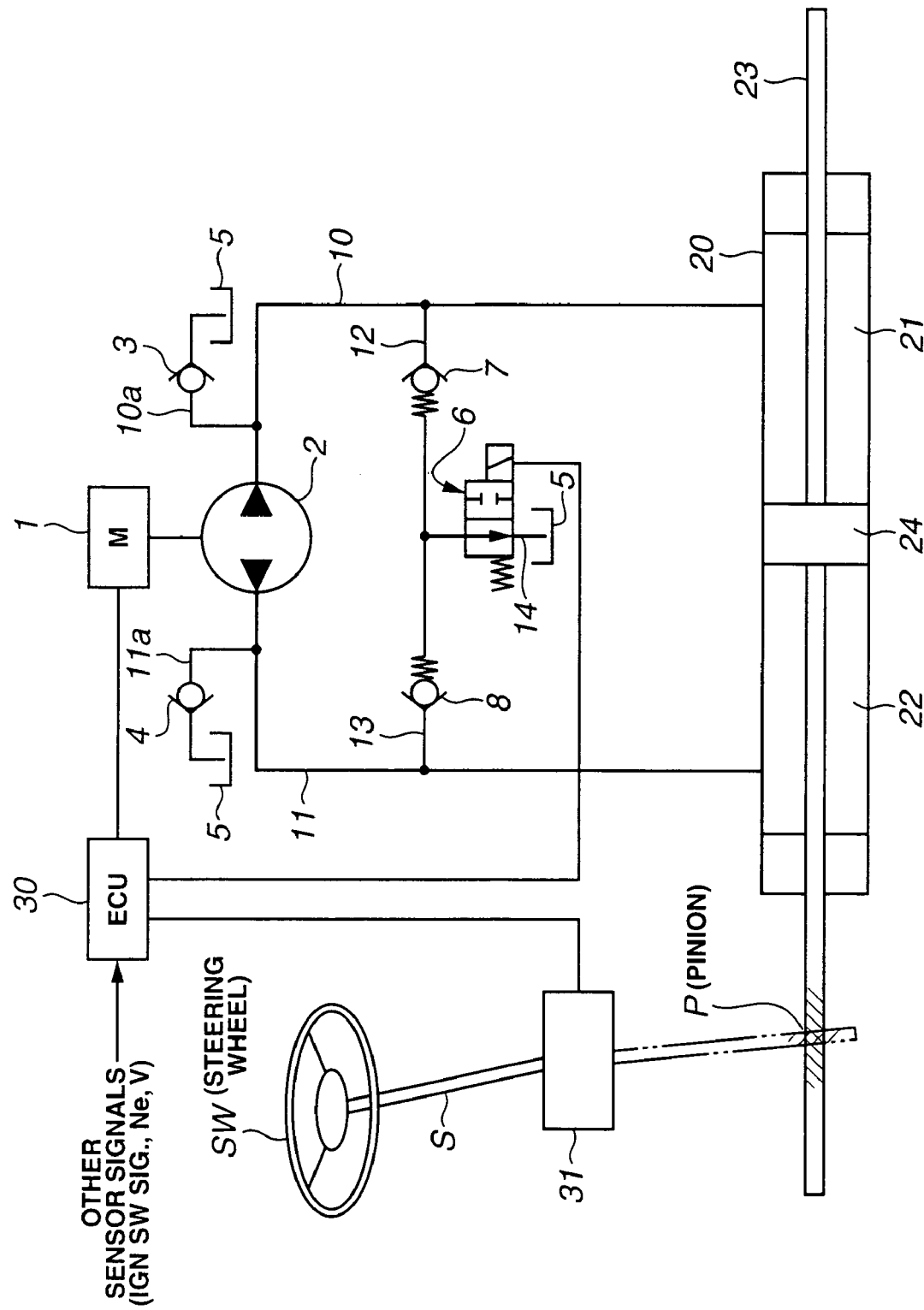
FIG. 1 is a system block diagram illustrating an embodiment of a power steering system.

Referring now to the drawings, particularly to FIG. 1, the power steering system of the embodiment is exemplified in an electronically-controlled hydraulic power steering system with a hydraulic power cylinder 20 and a reversible pump 2. As can be seen from the system diagram of FIG. 1, when a steering wheel SW is turned by the driver, rotary motion of a pinion P, formed on the lower end of a steering shaft S, is converted into straight-line motion (linear motion) of a rack shaft 23, thus causing steered wheels (front road wheels) to pivot to one side or the other side for steering. Pinion P formed on the lower end of steering shaft S and rack shaft 23, which is the major cross member of the steering linkage and whose rack portion meshes with the pinion, construct the rack-and-pinion steering gear. The rack-and-pinion steering gear (23, P) and steering shaft S construct the steering mechanism. As clearly shown in FIG. 1, a steering torque sensor 31 is installed on steering shaft S, for detecting the magnitude and sense of steering torque applied to steering shaft S via steering wheel SW by the driver. The sense of the applied steering torque means the direction of rotation of steering shaft S. Torque sensor 31 outputs an informational data signal to an electronic control unit (ECU) 30 (described later). A power steering device is mounted on rack shaft 23, for assisting axial movement (linear motion) of rack shaft 23 responsively to the steering torque indicative signal from torque sensor 31. The power steering device is mainly comprised of hydraulic power cylinder 20 and reversible pump 2. Reversible pump 2 is driven by an electric motor 1. Power cylinder 20 accommodates therein a piston 24, so that a pair of hydraulic chambers 21 and 22 are defined on both sides of piston 24. The first hydraulic chamber 21 is connected via a first pressure line (or a first working-fluid passage or a first fluid line) 10 to a first discharge port of pump 2, whereas the second hydraulic chamber 22 is connected via a second pressure line 11 to a second discharge port of pump 2. One end of a first inflow line 10a is connected to the upstream end of first pressure line 10, while the other end of first inflow line 10a is connected through a first inflow check valve 3 to a reservoir 5. In a similar manner, one end of a second inflow line 11a is connected to the upstream end of second pressure line 11, while the other end of second inflow line 11a is connected through a second inflow check valve 4 to reservoir 5. A communicating circuit or a bypass circuit (12, 13) is disposed between first and second pressure lines 10 and 11 so as to directly intercommunicate them not through pump 2. The communicating circuit (12, 13) is comprised of first and second communicating lines 12 and 13 joined to each other. A drain line 14 is connected at one end to the joined portion of first and second communicating lines 12 and 13. The end of drain line 14 is connected to reservoir 5. A normally-open, single solenoid-actuated two-position spring-offset directional control valve 6 is disposed in drain line 14. In other words, the joined portion of first and second communicating lines 12 and 13 is connected via directional control valve 6 and drain line 14 to reservoir 5. A first one-way check valve (or a first one-way directional control valve) 7 is disposed in first communicating line 12 for preventing back flow from the communicating circuit (i.e., first communicating line 12) to first pressure line 10. In a similar manner, a second one-way check valve (or a second one-way directional control valve) 8 is disposed in second communicating line 13 for preventing back flow from the communicating circuit (i.e., second communicating line 13) to second pressure line 11. In the shown embodiment, each of first and second one-way check valves 7 and 8 is comprised of a ball check valve having a ball held by a spring against a seat. In lieu thereof, each of check valves 7 and 8 may be comprised of a spring-loaded poppet check valve.

ECU (power-steering controller) 30 generally comprises a microcomputer. ECU 30 includes an input/output interface (I/O), memories (RAM, ROM), and a microprocessor or a central processing unit (CPU). As discussed above, the input/output interface (I/O) of ECU 30 receives the steering-torque indicative signal from torque sensor 31. Additionally, the input/output interface (I/O) of ECU 30 receives input information from various engine/vehicle switches and sensors, for example, an ignition switch, an engine speed sensor (a crank angle sensor), and a vehicle speed sensor. The ignition switch generates an ignition switch signal indicative of whether the ignition switch is turned ON or OFF. The engine speed sensor generates a signal indicative of engine speed Ne, whereas the vehicle speed sensor generates a signal indicative of vehicle speed V. Within ECU 30, the central processing unit (CPU) allows the access by the I/O interface of input informational data signals from the previously-discussed engine/vehicle switches and sensors. The CPU of ECU 30 is responsible for carrying the predetermined control program stored in memories and is capable of performing necessary arithmetic and logic operations containing a power-steering system control management processing (containing reversible motor control and valve control). That is, the processor of ECU 30 is comprised of a reversible motor control circuit (or a reversible motor control section) for motor control and a directional control valve control circuit for valve control. Computational results (arithmetic calculation results), that is, calculated output signals (command signals) are relayed through the output interface circuitry of ECU 30 to output stages, namely motor 1 and an electromagnetic solenoid (an electrically energized coil) of directional control valve 6 both included in the power steering control system. Concretely, the magnitude and sense of the steering assistance force are determined based on the signals from the previously-discussed engine/vehicle switches and sensors, in particular, the sensor signal from torque sensor 31. The output interface of ECU 30 outputs command signals, whose signal values are determined based on the computed steering assistance force, to the reversible motor 1 and directional control valve 6.

Figure 2:
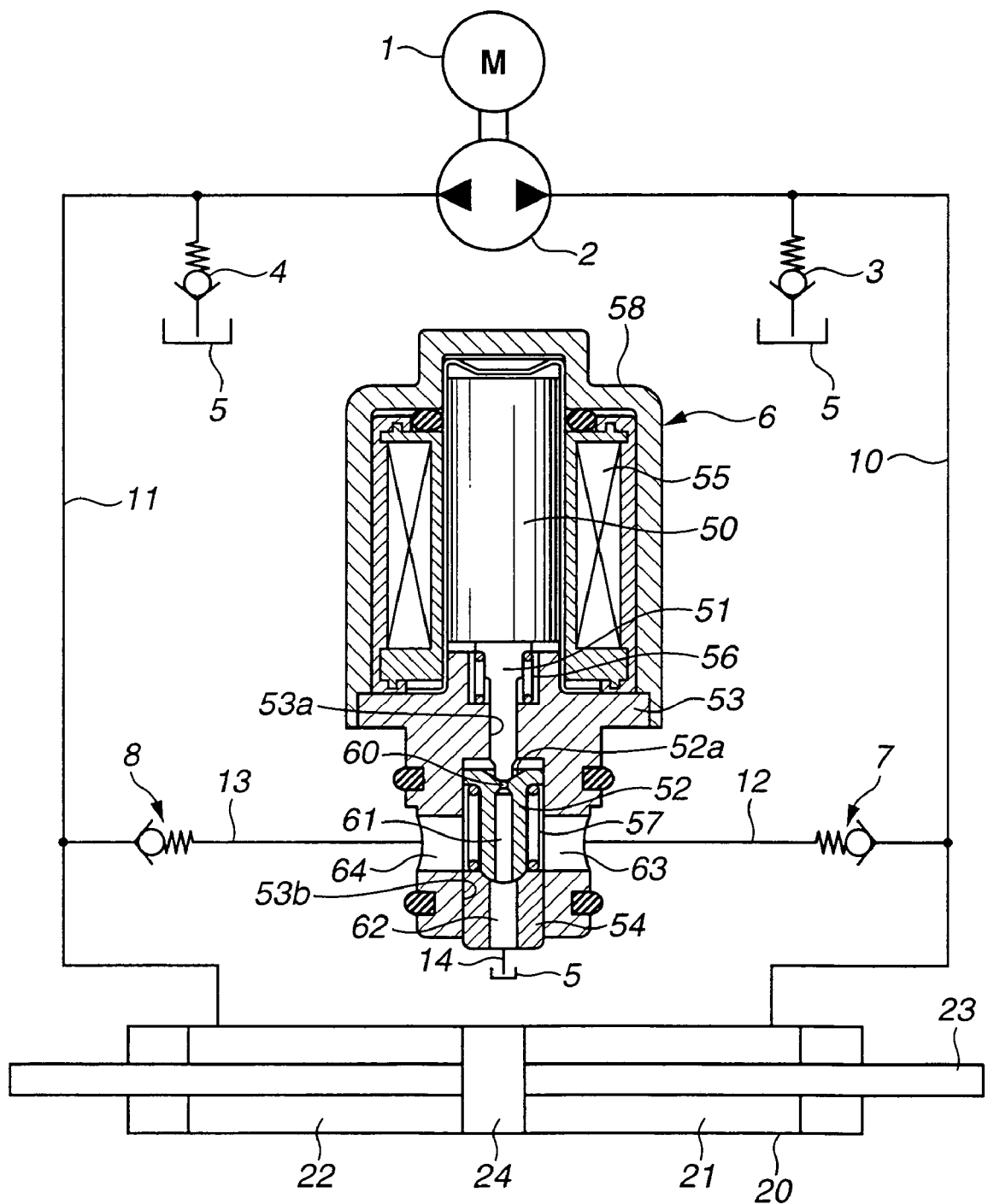
FIG. 2 is an enlarged, longitudinal cross-sectional view showing the detailed construction of a directional control valve with a first poppet not having an axial communicating bore and a second poppet having an axial communicating bore, incorporated in the power steering system of the embodiment.

Referring now to FIG. 2, there are shown the enlarged cross section concerning the detailed construction of solenoid-actuated directional control valve 6 and the hydraulic circuit diagram of the essential part of the power steering system of the embodiment. Directional control valve 6 is comprised of an electrically energized coil (electric solenoid) 55, an armature 50, a solenoid housing 58, and a valve housing 53. Armature 50, coil 55, and solenoid housing 58 construct a solenoid unit. First and second poppets 51 and 52 are axially slidably accommodated in a stepped axial bore (53a, 53b) formed in valve housing 53. In more detail, first poppet 51 is slidably disposed in a relatively small-diameter bore 53a of stepped axial bore (53a, 53b), whereas second poppet 52 is slidably disposed in a relatively large-diameter bore 53b of stepped axial bore (53a, 53b). When coil 55 is energized in response to a command signal from the output interface of ECU 30, it creates an electromagnetic force that pulls or attracts the armature into the coil. As clearly shown in FIG. 2, solenoid housing 58 has a cylindrical bore closed at the upper end. Coil 55 is installed in the cylindrical bore of solenoid housing 58 and arranged annularly along the inner periphery of solenoid housing 58, so that armature 50 is axially slidable in the coil. Valve housing 53 is press-fitted to the lower opening end of solenoid housing 58. As can be seen from the hydraulic circuit diagram of FIG. 2, actually, valve housing 53 of directional control valve 6 is located and joined to the joined portion of first and second communicating lines 12 and 13. A first return spring 56 is built in and operably disposed in valve housing 53 to permanently bias first poppet 51 in an axially upward direction. A second return spring 57 is also built in and operably disposed in valve housing 53 to permanently bias second poppet 52 in the axially upward direction. A cylindrical valve seat (a second poppet valve seat) 54 is press-fitted to the lowermost opening end of large-diameter bore 53b of stepped axial bore (53a, 53b). Valve seat 54 is formed with a relatively large-diameter, axial communication bore 62 whose lower opening end communicates reservoir 5 through drain line 14. Large-diameter communication bore 62 serves as a drain port through which working fluid is directed to the reservoir. The upper opening end of large-diameter communication bore 62 is formed as a substantially semi-spherically chamfered valve-seat portion on which second poppet 52 seats. Valve housing 53 is also formed with a first communication port 63 communicating the first communicating line 12 and a second communication port 64 communicating the second communicating line 13. In directional control valve 6 incorporated in the hydraulic power steering system of the embodiment, note that first and second poppets 51 and 52 are provided and that second poppet 52 has a conically-chamfered, upper valve seat portion (first poppet valve seat) 52a on which first poppet 51 seats, a relatively small-diameter, axial communication bore (simply, a first communication bore) 60, and a relatively middle-diameter, axial communication bore (simply, a second communication bore) 61. First communication bore 60 communicates the conically-chamfered valve seat portion 52a. Second communication bore 61 has a relatively larger inside diameter than first communication bore 60. Second communication bore 61 intercommunicates first communication bore (the small-diameter axial communication bore) 60 of second poppet 52 and large-diameter axial communication bore 62 of valve seat 54. The upper end of first poppet 51 is fixedly connected to the bottom of armature 50. Armature 50, first poppet 51, second poppet 52 formed with small-diameter and middle-diameter communication bores 60 and 61, and valve seat 54 formed with large-diameter communication bore 62 are axially aligned with each other (see the longitudinal cross section shown in FIG. 2).

[During Turned-Off Period of Ignition Switch]

With the previously-discussed valve construction of directional control valve 6, when the ignition switch is turned OFF, coil 55 is de-energized and thus armature 50 is forced in the axially upward direction by the spring bias of first spring 56 acting on first poppet 51. Thus, first poppet 51 is held at its uppermost position (unactuated position). At this time, second poppet 52 axially upwardly moves away from valve seat 54 by the spring bias of second spring 57. As a result of this, first and second poppets 51 and 52 are held at their unactuated positions. Under the unactuated condition or under the de-energized condition where first poppet 51 is held at the uppermost position and additionally seated on the conically-chamfered valve seat portion 52a and second poppet 52 is lifted off its seat, first and second communication ports 63 and 64 and large-diameter communication bore (drain port) 62 are communicated with each other. Thus, each of first and second communicating lines 12 and 13 (the communicating circuit) is communicated with reservoir 5 via drain line 14, thereby ensuring the manual steering mode with the ignition switch turned OFF (in other words, with first and second poppets 51 and 52 held at their unactuated positions).

[During Turned-On Period of Ignition Switch]

Conversely when the ignition switch is turned ON, coil is energized and thus armature 50 is pulled or attracted in the axially downward direction by way of the electromagnetic force created by coil 55. Thus, first poppet 51 moves down against the spring bias (spring force) of first spring 56. The poppet valve portion of first poppet 51 is seated on the conically-chamfered valve seat portion 52a of second poppet 52. The poppet valve portion of first poppet 51 shuts off first communication bore 60. At this time, owing to the downward motion of first poppet 51, second poppet 52 also moves down against the spring bias of second spring 57. The poppet valve portion of second poppet 52 is forced and seated on the upper semi-spherically chamfered valve-seat portion of valve seat 54, so as to block working fluid flow through large-diameter communication bore 62 of valve seat 54 to drain line 14. Under the actuated condition or under the energized condition where first poppet 51 is held at the lowermost position and seated on the conically-chamfered valve seat portion 52a and second poppet 52 is also held seated on valve seat 54, fluid-communication between large-diameter communication bore 62 and each of first and second communication ports 63 and 64 is blocked. Thus, when pump 2 is driven to produce a desired steering assistance force and as a result hydraulic pressure is supplied from pump 2 to either one of first and second hydraulic chambers 21 and 22, there is a less possibility of working-fluid leakage from the closed-loop hydraulic circuit to reservoir 5 in the energized state of coil 55, in other words, with large-diameter communication bore (drain port) 62 fully closed or shut off by directional control valve 6. This is because directional control valve 6 of the hydraulic power steering system of the embodiment has a double poppet valve mechanism constructed by first and second poppets 51 and 52 and having a less tendency of working-fluid leakage as compared to the spool valve structure. In the energized state of coil 55 or with directional control valve 6 held at the closed position, the system of the embodiment ensures a power steering mode (or a power-assist control mode) at which steering assistance is produced.

[Normal Power-Assist Control]

Suppose that the power steering system is unfailed and thus conditioned in the normal power-assist control mode (i.e., in the normal power steering mode), and additionally steering wheel SW is turned in a rotational direction by the driver to move rack shaft 23 in the axially leftward direction (viewing FIGS. 1–2). At this time, torque sensor 31 detects or monitors the magnitude and sense of steering torque applied to steering shaft S via steering wheel SW by the driver, and generates an informational data signal indicative of the magnitude and sense of the driver-applied steering torque. A command signal (or a drive signal), which is determined based on the informational data signal from torque sensor 31, is output from ECU 30 to motor 1 to properly drive reversible pump 2 for steering assistance. As discussed above, in presence of the rotary motion of steering wheel SW and axially leftward movement of rack shaft 23, when motor 1 is driven responsively to the drive signal based on the sensor signal from torque sensor 31, reversible pump 2 operates to feed working fluid (power-steering fluid) from second hydraulic chamber 22 therevia to first hydraulic chamber 21. The working fluid flow from second hydraulic chamber 22 via pump 2 to first hydraulic chamber 21 creates a pressure buildup on the right-hand side of piston 24 and simultaneously creates a pressure drop on the left-hand side of piston 24. By virtue of the greater hydraulic pressure in first hydraulic chamber 21, in other words, the higher pressure applied to the right-hand side of piston 24, piston 24 is pushed axially leftwards (viewing FIGS. 1–2) to produce a steering assistance force, thus reducing steering effort. As described previously, to provide steering assistance in presence of the rotary motion of steering wheel SW and axially leftward movement of rack shaft 23, flow of working fluid stored in second hydraulic chamber 22 via pump 2 to first hydraulic chamber 21 is used for a pressure buildup of working fluid in first hydraulic chamber 21. In addition to the use of working fluid stored in second hydraulic chamber 22, flow of working fluid from reservoir 5 via second inflow check valve 4 and pump 2 to first hydraulic chamber 21 may be used for a pressure buildup on the right-hand side of piston 24. Under a condition where the working-fluid flow from second hydraulic chamber 22 via pump 2 to first hydraulic chamber 21 is occurring, suppose that the hydraulic pressure in first communicating line 12 of the communicating circuit (the bypass circuit) is low. In such a case, part of the working fluid flow from first pressure line 10 to first hydraulic chamber 21 is also supplied into first communicating line 12, and whereby the hydraulic pressure of working fluid supplied into first communicating line 12 is charged in the communicating circuit (12, 13) by means of first and second check valves 7 and 8 and directional control valve 6 closed. In other words, when the pressure level of working fluid discharged from pump 2 is higher than the hydraulic pressure charged in the communicating circuit, a rise in hydraulic pressure in the communicating circuit occurs. Conversely when the pressure level of working fluid discharged from pump 2 is lower than the hydraulic pressure charged in the communicating circuit, the hydraulic pressure in the communicating circuit is kept constant by means of first and second check valves 7 and 8 and directional control valve 6 closed. As can be appreciated from the above, during the normal power steering mode (or during the normal power-assist control mode), with directional control valve 6 fully closed, hydraulic pressure P, charged in the communicating circuit (12, 13) by means of two check valves 7 and 8, is high, and thus each of check valves 7 and 8 is held in a no-flow condition. With check valves 7 and 8 held in their no-flow conditions, fluid communication between first and second pressure lines 10 and 11 is blocked during the normal power-assist control mode (with the ignition switch turned ON or with solenoid-actuated directional control valve 6 energized and fully closed). As set forth above, in the power steering system of the embodiment shown in FIGS. 1–2, the poppet valve mechanism is utilized as the directional control valve joined to the communicating circuit (12, 13), thus ensuring reliable operation of the directional control valve. The hydraulic operation of the hydraulic power steering system of the embodiment for the opposite rotary motion of steering wheel SW is similar to that described for the rotary motion of steering wheel SW, except that the direction of working-fluid flow from second hydraulic chamber 22 via pump 2 to first hydraulic chamber 21 is changed to the direction of working-fluid flow from first hydraulic chamber 21 via pump 2 to second hydraulic chamber 22. For the purpose of simplification of the disclosure, detailed description of the hydraulic operation for the opposite rotary motion of steering wheel SW (axially rightward movement of rack shaft 23) will be omitted.

In contrast to the above, as described later in detail in reference to the time charts shown in FIGS. 3A–3D, in presence of the power steering system failure, ECU 30 controls directional control valve 6 to open the valve 6, i.e., coil 55 is deenergized, and directional control valve 6 is shifted from the closed state to the open state in which hydraulic pressure P, charged in the communicating circuit (12, 13) by means of two check valves 7 and 8, becomes low. And thus each of check valves 7 and 8 is held in a free-flow condition. With check valves 7 and 8 held in their free-flow conditions, fluid communication between first and second pressure lines 10 and 11 is established, thus permitting the hydraulic pressure to be smoothly relieved from each of first and second pressure lines 10 and 11 to the reservoir during a transition from the normal power-assist control mode to the manual steering mode with solenoid-actuated directional control valve 6 de-energized and shifting to its fully opened state.

[Operation of Directional Control Valve Closed]

Hereinafter described is the operation of directional control valve 6 held at its closed position in the power steering system unfailed state, in other words, in the solenoid-energized state under the condition where the hydraulic pressure charged in the communicating circuit is present. Assuming that a pressure value of the hydraulic pressure charged in the communicating circuit (12, 13) is denoted by "P", an attracting force (electromagnetic force) created by coil 55 is denoted by "Fs", a spring bias of first spring 56 is denoted by "Fk1", and an effective cross-sectional area of first communication bore 60 is denoted by "As1", the summed force (the resultant force) Fs1 of three forces (or three pressures) acting on first poppet 51 is represented by the following expression.

$$Fs1=Fs+Fp1-Fk1$$

where the force denoted by "Fs" is the attracting force that pulls armature 50 into coil 55, the force denoted by "Fp1" is a pressure force acting on first poppet 51 by the pressure differential between hydraulic pressure P in the communicating circuit (12, 13) and hydraulic pressure in drain line 14, and the force denoted by "Fk1" is the spring bias (reaction force) of first spring 56.

Under the energized condition of coil 55 or with directional control valve 6 closed, first poppet 51 fixedly connected to armature 50 is seated on the conically-chamfered valve seat portion 52a of second poppet 52, and therefore the pressure force Fp1 (occurring owing to the previously-noted pressure differential) given by the product (P·As1) of hydraulic pressure P in the communicating circuit (12, 13) and effective cross-sectional area As1 of first communication bore 60 acts on first poppet 51, such that first poppet 51 is forced axially downwards. Assuming that the downward force is positive, first poppet 51 can be held seated on the conically-chamfered valve seat portion 52a of second poppet 52 under a specific condition defined by the inequality Fs1=(Fs+Fp1−Fk1)≧0. In other words, when the condition defined by the inequality Fs+Fp1≧Fk1 is satisfied and thus the summed force Fs1 of three forces acting on first poppet 51 is positive (Fs1≧0), first poppet 51 is held seated on the conically-chamfered valve seat portion 52a.

Next, on the assumption that (i) the pressure applied from first poppet 51 to second poppet 52 is equivalent to the summed force Fs1 (=Fs+Fp1−Fk1) of forces acting on first poppet 51, (ii) a spring bias of second spring 57 is denoted by "Fk2", and (iii) an effective cross-sectional area of large-diameter communication bore 62 is denoted by "As2" (>As1), the summed force (the resultant force) Fs2 of three forces (or three pressures) acting on second poppet 52 is represented by the following expression.

$$Fs2=Fs1+Fp2-Fk2$$

where the force denoted by "Fs1" is the summed force of three forces acting on first poppet 51, in other words, the axial force applied from first poppet 51 to second poppet 52, the force denoted by "Fp2" is a pressure force acting on second poppet 52 by the pressure differential between hydraulic pressure P in the communicating circuit (12, 13) and hydraulic pressure in drain line 14, and the force denoted by "Fk2" is the spring bias (reaction force) of second spring 57.

Under the energized condition of coil 55 (with directional control valve 6 closed), second poppet 52 is held seated on valve seat 54, and therefore the pressure force Fp2 given by the product {P·(As2−As1)} of the hydraulic pressure P in the communicating circuit (12, 13) and the difference (As2−As1) between effective cross-sectional areas As2 and As1 of large-diameter communication bore 62 and first communication bore (small-diameter communication bore) 60 acts on second poppet 52, such that second poppet 52 is forced downwards. Assuming that the downward force is positive, second poppet 52 can be held seated on valve seat 54 under a specific condition defined by the inequality Fs2=(Fs1+Fp2−Fk2)≧0. In other words, when the condition defined by the inequality Fs1+Fp2≧Fk2 is satisfied, second poppet 52 is held seated on valve seat 54.

As discussed above, the hydraulic pressure P, charged in the communicating circuit (12, 13) by means of first and second check valves 7 and 8, produces an assisting force that acts in the direction of closing of each of first and second poppets 51 and 52, when closing directional control valve 6 by turning the ignition switch ON. This contributes to the reduced current value of exciting current applied to coil 55 during the normal power steering mode, that is, down-sizing of coil 55, in other words, the reduced total size of directional control valve 6.

[Operation of Directional Control Valve in Transition from Closed to Open State]

Hereinafter described in reference to the time charts shown in FIGS. 3A–3D, is the operation of directional control valve 6 in a transition from the closed position (the solenoid-energized state) to the open position (the solenoid-deenergized state), under the condition where the hydraulic pressure P charged in the communicating circuit (12, 13) is present. Just before switching to the solenoid-deenergized state, coil 55 is still held in the energized state, and thus the downward force, which is created owing to the electromagnetic force Fs created by coil 55 and the pressure differential between hydraulic pressure P in the communicating circuit (12, 13) and hydraulic pressure in drain line 14, acts on each of first and second poppets 51 and 52. Under these conditions, suppose that coil 55 is changed from the energized state (ON state) to the deenergized state (OFF state) at the time t1. Simultaneously with switching to the deenergized (OFF) state at the time t1, the attracting force Fs of armature 50 rapidly drops to zero (see FIG. 3B). Under the condition where the hydraulic pressure P in the communication circuit is kept substantially constant before the time t1, the summed force Fs1 of three forces acting on first poppet 51 tends to reduce owing to the rapid drop in attracting force Fs from the time t1. Thereafter, when the condition defined by the inequality Fs+Fp1≧Fk1 becomes unsatisfied and thus the reaction force (upward force) Fk1 of spring 56 becomes greater than the pressure force Fp1 acting on first poppet 51 by the pressure differential between hydraulic pressure P in the communicating circuit (12, 13) and hydraulic pressure in drain line 14 (Fs+Fp1=Fp1<Fk1), first poppet 51 begins to move up. Notice that effective cross-sectional area As1 of first communication bore 60 is properly specified and set to a comparatively small value as compared to the other axial communication bores such as bores 61 and 62. By virtue of the specified small effective cross-sectional area As1 of first communication bore 60, the pressure force Fp1 (=P·As1), occurring due to the pressure differential, can be suppressed to a small value, even when the hydraulic pressure P in the communicating circuit is very high. Furthermore, in the system of the shown embodiment, a set load of first spring 56 is properly set to a specified small value. By virtue of the proper setting of set load of first spring 56 to the specified small value, the system of the shown embodiment does not require a large magnitude of electromagnetic force created by coil 55, even when the hydraulic pressure P in the communicating circuit is low. At this time, that is, during the time period from t1 to t2, owing to the upward motion of first poppet 51, arising from the reaction force Fk1 (>Fp1) of spring 56, first poppet 51 moves apart from the conically-chamfered valve seat portion 52a of second poppet 52, and thus there is no application of axial force Fs1 applied from first poppet 51 to second poppet 52, that is, Fs1=0. Thus, during the time period t1–t2, the summed force Fs2 of three forces acting on second poppet 52 is represented as follows.

$$Fs2=Fs1+Fp2-Fk2=0+Fp2-Fk2=P\cdot(As2-As1)-Fk2$$

Just after the time t1, the mutual relationship among hydraulic pressure P in the communication circuit, reaction force Fk2 of second spring 57, effective cross-sectional area As1 of first communication bore 60, and effective cross-sectional area As2 (>As1) of large-diameter communication bore 62 is set to satisfy the condition defined by the inequality Fp2>Fk2. The inequality Fp2>Fk2 means that second poppet 52 is still forced downwards by means of the downward force (Fp2−Fk2>0) just after the time t1. In this manner, by way of the proper setting of hydraulic pressure P in the communication circuit, reaction force Fk2 of second spring 57, and effective cross-sectional area As2 (>As1) of large-diameter communication bore 62 greater than effective cross-sectional area As1 of first communication bore 60, just after switching to the de-energized state of coil 55, it is possible to maintain the desired condition where only the second poppet 52 is held seated inside the directional control valve while the first poppet 51 is not held seated (see the time charts of FIGS. 3C–3D). With first poppet 51 unseated and second poppet 52 seated, hydraulic pressure P in the communicating circuit (12, 13) is gradually relieved from only the upper conically-chamfered valve seat portion 52a of second poppet 52 via small-diameter and middle-diameter communication bores 60 and 61 and large-diameter communication bore 62 to drain line 14. Thus, hydraulic pressure P in the communicating circuit begins to gradually reduce (see the time interval from t1 to t2 in FIG. 3A). As a result of the gradual reduction in hydraulic pressure P, the pressure force Fp2 {=P·(As2−As1)} acting on second poppet 52 also begins to reduce.

At the time t2, as soon as hydraulic pressure P in the communicating circuit (12, 13) reaches a predetermined hydraulic pressure value $P_0$ and reduces to below the predetermined hydraulic pressure value $P_0$, the pressure force Fp2 {=P·(As2−As1)} acting on second poppet 52 becomes less than the reaction force Fk2 of second spring 57 and thus second poppet 52 is forced off its seat 54. In this manner, the poppet valve portion of second poppet 52 is opened (see the time t2 in FIG. 3D), and then the hydraulic pressure P can be relieved from the communicating circuit (12, 13) directly through large-diameter communication bore 62 (having the relatively larger effective cross-sectional area As2) of valve seat 54 to drain line 14. The previously-noted predetermined hydraulic pressure value $P_0$ is a preset pressure value, which is properly determined or settable based on the reaction force Fk2 of second spring 57 and the difference (As2−As1) between effective cross-sectional areas As2 and As1 of communication bore 62 and first communication bore 60.

[Comparison Between Poppet Valve Mechanism with 2nd Poppet Having 1st and 2nd Axial Bores and Poppet Valve Mechanism with 2nd Poppet not Having 1st and 2nd Axial Bores]

Figure 4:
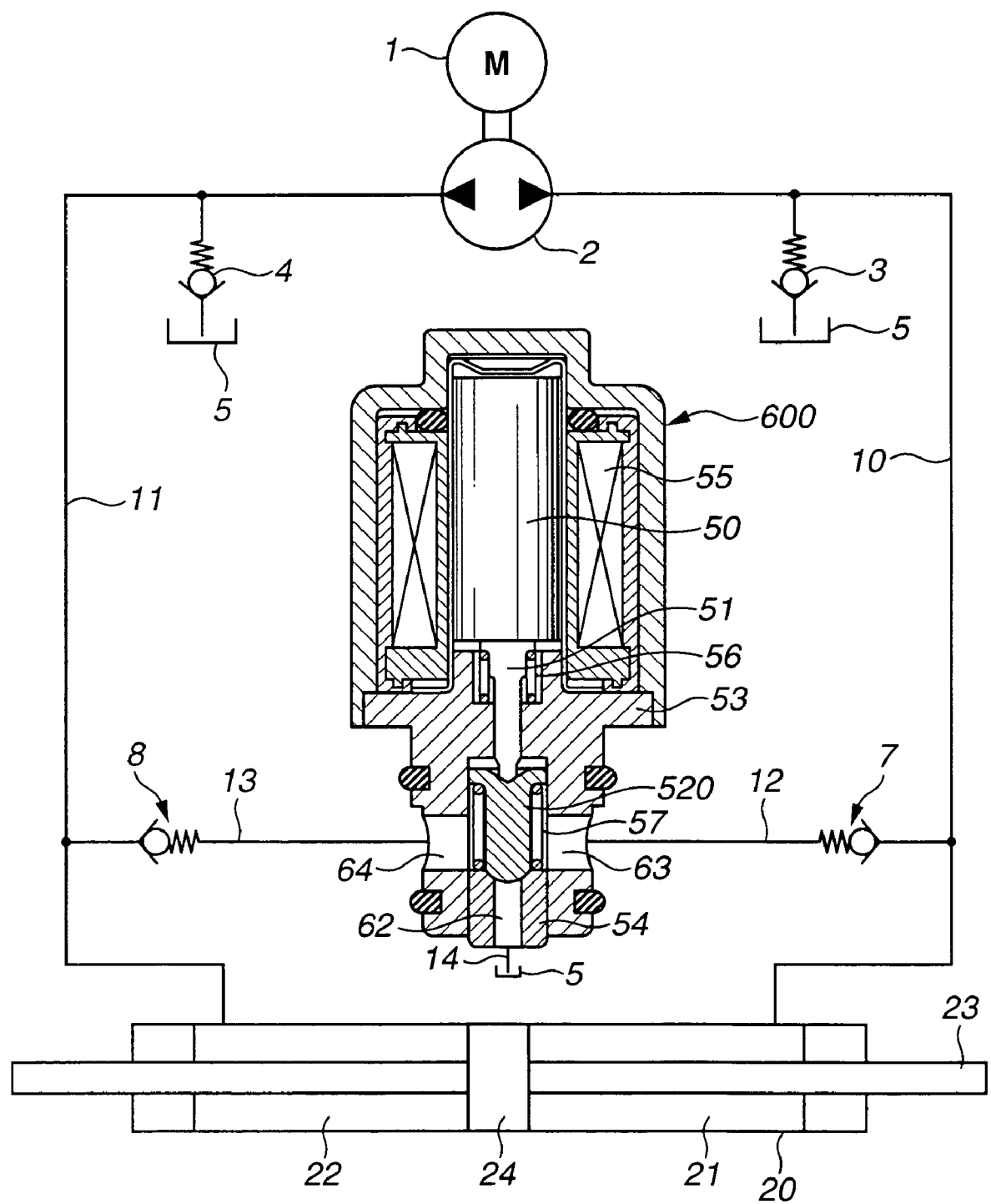
FIG. 4 is a comparative view illustrating an enlarged cross section of a directional control valve with a pair of poppets each not having an axial communicating bore.

Referring now to FIG. 4, there is shown the comparative drawing of a directional control valve (a double poppet valve mechanism) 600 with two axially-aligned poppets 51 and 520, each not having an axial communication bore. As can be appreciated from comparison of the cross sections of FIGS. 2 and 4, second poppet 520 disposed inside of directional control valve 600 of the comparative drawing of FIG. 4 does not have first and second axial communication bores 60 and 61 as shown in FIG. 2. In explaining the hydraulic power steering system of the comparative drawing of FIG. 4 having the double poppet valve mechanism (directional control valve 600) without $1^{st}$ and $2^{nd}$ axial communication bores 60 and 61, for the purpose of comparison of the two different poppet valve mechanisms shown in FIGS. 2 and 4, the same reference signs used to designate elements in the poppet valve mechanism (directional control valve 6) shown in FIG. 2 will be applied to the corresponding elements used in the comparative example of the poppet valve mechanism (directional control valve 600) shown in FIG. 4, while detailed description of the same reference signs will be omitted because the above description thereon seems to be self-explanatory. As can be appreciated, the operation of directional control valve 600 of the comparative drawing of FIG. 4 is basically similar to that of directional control valve 6 of the system of the embodiment of FIG. 2. However, the operation of directional control valve 600 of the comparative drawing of FIG. 4 slightly differs from that of directional control valve 6 of the system of the embodiment of FIG. 2, in that any axial communication bores (60, 61) are not formed in second poppet 520 and thus there is no application of pressure force Fp1 to first poppet 51 due to the differential pressure between hydraulic pressure P in the communicating circuit (12, 13) and hydraulic pressure in drain line 14, that is, Fp1=0. Thus, the summed force Fs1 of forces (or pressures) acting on first poppet 51 is represented by the expression Fs1=Fs+Fp1−Fk1=Fs−Fk1, because of Fp1=0.

With the system arrangement of FIG. 4, when the hydraulic pressure P in the communicating circuit (12, 13) rises, the pressure force Fp2 {=P·(As2−As1)=P·(As2−0)=P·As2} acting on second poppet 520 also becomes great. At this time, the summed force Fs2 of forces (or pressures) acting on second poppet 520 represented by the expression Fs2=Fs1+Fp2−Fk2=(Fs−Fk1)+(P·As2)−Fk2, becomes positive. Thus, the communicating circuit (12, 13) is shut off by the second poppet 520 held seated on valve seat 54. Thus, fluid communication between the communicating circuit (12, 13) and drain line 14 is completely blocked by second poppet 520. Hereunder described in detail is the operation of directional control valve 600 of the comparative drawing of FIG. 4 under the specific condition where the hydraulic pressure P in the communicating circuit (12, 13) is very high. Suppose that, as a result of steering assistance during the power steering mode (power-assist control mode), the hydraulic pressure P charged in the communicating circuit (12, 13) is maintained at a very high pressure value $P_{High}$. Owing to such a very high pressure value $P_{High}$, the pressure force Fp2 acting on second poppet 520 also becomes very high. Under these conditions, suppose that a set load of second spring 57 is small. Due to the small set load of second spring 57, it is impossible for the reaction force Fk2 of second spring 57 to overcome the very high pressure force Fp2 (=P·As2) acting on second poppet 520 even with coil 55 de-energized, in other words, even with no application of attracting force Fs that downwardly pulls armature 50. Due to the small set load of second spring 57, second poppet 520 is undesirably held seated on its seat 54 even with coil 55 de-energized, and therefore it is impossible to relieve the hydraulic pressure P in the communicating circuit (12, 13) to drain line 14. For the reasons discussed above, in case of the power steering system of the comparative drawing of FIG. 4 having the double poppet valve mechanism (directional control valve 600) without $1^{st}$ and $2^{nd}$ axial communication bores 60 and

61, a set load of second spring 57 has to be set to a specified large load value above which it is possible to lift up second poppet 520 against the pressure force Fp2 (=P·As2) acting on second poppet 520 even if the estimated maximum hydraulic pressure is created.

On the contrary, suppose that the hydraulic pressure P charged in the communicating circuit (12, 13) is maintained at a very low pressure value $P_{Low}$. As a matter of course, the hydraulic pressure P, charged in the communicating circuit (12, 13) by means of first and second check valves 7 and 8 and producing an assisting force that acts in the direction of closing of second poppet 520, is very low. When closing directional control valve 600 under the very low hydraulic pressure $P_{Low}$, the pressure force Fp2 (=P·As2) acting on second poppet 520 is unexpectedly low. Most of the work of closing of directional control valve 600 depends on attracting force Fs that downwardly pulls armature 50 and does not spread on it. However, owing to the unpreferable setting of set load of second spring 57 to the specified large load value, the system of the comparative diagram shown in FIG. 4 requires a large magnitude of electromagnetic force Fs created by coil 55. This leads to the problem of large-sizing of coil 55, in other words, increased electric power consumption. To avoid the previously-noted problems (e.g., high set load of second spring 57 and large-sized coil 55) occurring in the system of the comparative drawing of FIG. 4 having the double poppet valve mechanism (directional control valve 600) without $1^{st}$ and $2^{nd}$ axial communication bores 60 and 61, it is possible to make the effective cross-sectional area As2 of large-diameter communication bore 62 of valve seat 54 small. However, owing to the small effective cross-sectional area As2 of large-diameter communication bore 62 formed in valve seat 54, it is impossible to quickly drop hydraulic pressure P in the communicating circuit (12, 13) from the point of time when directional control valve 600 has been switched from the closed (actuated) state to the open (unactuated) state. This leads to another problem, such as a deteriorated responsiveness of pressure-reducing action to hydraulic pressure P charged in the communicating circuit.

In contrast, in the hydraulic power steering system of the embodiment, as clearly shown in FIG. 2, second poppet 52 has first and second communication bores 60 and 61 formed therein. By virtue of the provision of first and second communication bores 60 and 61, it is possible to lift first poppet 51 axially upwards by a slight applied force by virtue of the relatively small-diameter axial communication bore 60 having effective cross-sectional area As1 (<As2) less than effective cross-sectional area As2 of large-diameter communication bore 62, even under the high hydraulic pressure charged in the communicating circuit (12, 13). This means that the set load of first spring 56 can be preset to a specified small value. As described previously, by virtue of the proper setting of set load of first spring 56 to the specified small value, the system of the embodiment does not require a large magnitude of electromagnetic force Fs created by coil 55 even when the hydraulic pressure P in the communicating circuit is low.

Figure 3A:
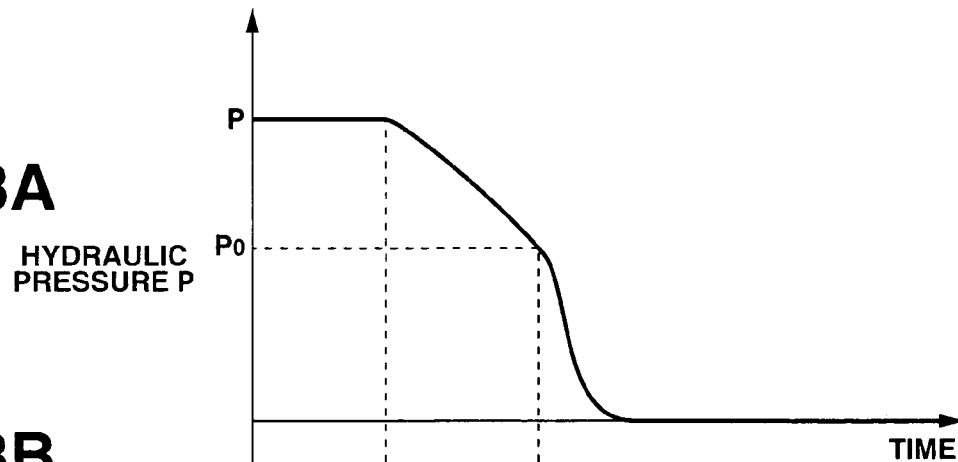
FIGS. 3A–3D are timing charts explaining the operation of the directional control valve of the power steering system of the embodiment.
Figure 3B:
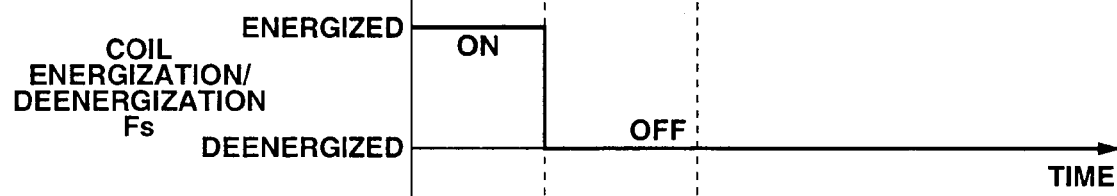
Figure 3C:
Figure 3D:
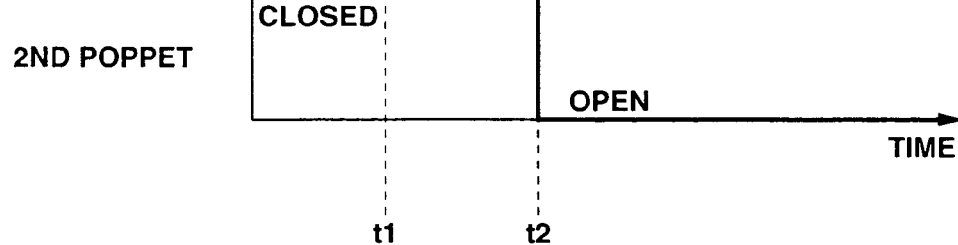

In the double poppet mechanism (51, 52) of directional control valve 6 of the system of the embodiment, when the hydraulic pressure P in the communicating circuit begins to gradually moderately reduce owing to upward movement of first poppet 51 and then reaches predetermined hydraulic pressure value $P_0$, second poppet 52 shifts automatically to the open state (see the time t2 in FIGS. 3A and 3D). Therefore, even under a condition that the hydraulic pressure P in the communicating circuit is high and thus the comparatively high pressure force Fp2 acts on second poppet 52, if the hydraulic pressure P in the communicating circuit has reduced to below the predetermined pressure value after the upward movement of first poppet 51, the pressure force Fp2 becomes rapidly low from the time t2 (see the expression Fp2=P·(As2−As1) and the time t2 in FIGS. 3A–3D). Thus, in the system of the embodiment, it is possible to preset a set load of second spring 57, serving as a reaction force against the pressure force Fp2 acting on second poppet 52, to a specified small value, thus properly suppressing or reducing a design electromagnetic force created by coil 55. This avoids the problem of large-sizing of coil 55, and reduces electric power consumption.

Additionally, the double poppet mechanism (51, 52) of directional control valve 6 of the system of the embodiment, effective cross-sectional area As1 of first communication bore 60 is dimensioned to be less than that of second communication bore 61. Thus, first communication bore 60 having the relatively smaller effective cross-sectional area As1 serves as a flow-constriction orifice that prevents a rapid change in hydraulic pressure. Moreover, in the system of the embodiment having directional control valve 6 of the double poppet valve mechanism, in a transition from the valve closed state to the valve open state, there are two different hydraulic-pressure reducing actions or two different hydraulic-pressure relieving actions, namely (i) the first pressure-relieving action (see the moderate drop in hydraulic pressure P during the time period t1–t2 in FIG. 3A–3D) that hydraulic pressure P is gradually moderately relieved from only the upper conically-chamfered valve seat portion 52a of second poppet 52 via first and second communication bores 60 and 61 and large-diameter communication bore 62 to drain line 14, and (ii) the second pressure-relieving action (see the rapid drop in hydraulic pressure P after the time t2 in FIG. 3A–3D) that hydraulic pressure P is rapidly relieved from the communicating circuit (12, 13) directly through large-diameter communication bore 62 (having the relatively larger effective cross-sectional area As2) of valve seat 54 to drain line 14. Thus, it is possible to quickly relieve the hydraulic pressure P in the communicating circuit (12, 13) to the reservoir for a desired time duration without rapid changes in hydraulic pressure P.

As can be appreciated from the above, the hydraulic power steering system of the embodiment has the following effects (1)–(7).

(1) Directional control valve 6 has a poppet valve mechanism (51, 52), thus ensuring the more enhanced fluid-tight seal performance in the normal power-assist control mode (or in the normal power steering mode). In case of directional control valve 6 using the poppet valve mechanism, there is a less possibility of the valve sticking due to contamination or debris and there is a less possibility of working-fluid leakage. Assuming that directional control valve 6 has been stuck or locked due to contamination or debris, there is a reduced tendency for directional control valve 6 having the poppet valve mechanism (the poppet valve structure) to be stuck in its closed position, as compared to the spool valve structure. Thus, even with directional control valve 6 stuck, the system of the embodiment can realize the manual steering mode, because of a less possibility of directional control valve 6 sticking in its closed position. This ensures the more reliable operation of directional control valve 6.

(2) Directional control valve 6 having the poppet valve mechanism is operated in response to the hydraulic pressure applied to directional control valve 6, such that the opening area of directional control valve 6 increases, as the hydraulic pressure applied to directional control valve 6 (exactly, hydraulic pressure P in the communicating circuit) reduces (see FIGS. 3A–3D). Thus, under a condition where the hydraulic pressure P is high, in other words, during a power-assist control mode at which steering assistance is produced, the opening area of directional control valve 6 is decreasingly compensated for or reduced to a minimum (zero valve opening). Therefore, it is possible to prevent a steering assistance force from rapidly dropping. Additionally, the opening area of directional control valve 6 can be smoothly increased in accordance with a gradual reduction in hydraulic pressure P (see the time period t1–t2 in FIGS. 3A–3D). Thus, it is possible to certainly smoothly relieve the hydraulic pressure P in the communicating circuit to the reservoir within a predetermined time period, thereby reliably reducing the steering effort during the manual steering mode.

(3) Directional control valve 6 is connected to each of first communicating line 12 connected to first pressure line 10, second communicating line 13 connected to second pressure line 11, and reservoir 5. On the one hand, directional control valve 6 serves to intercommunicate first and second pressure lines 10 and 11 through first and second communicating lines 12 and 13. On the other hand, directional control valve 6 serves as a solenoid-actuated pressure regulating valve (or a solenoid-actuated pressure relieving valve) that smoothly releases the hydraulic pressure in first and second pressure lines 10 and 11 to the reservoir by de-energizing coil 55 responsively to a command signal from a valve controller (i.e., the directional control valve control circuit) only in presence of the power steering system failure, thus reducing a pumping loss during the manual steering mode.

(4) Directional control valve 6 is comprised of (i) valve housing 53 having a first axial bore, namely stepped axial bore (53a, 53b), communicating the reservoir, first communication port 63 connected to first communicating line 12 for intercommunicating the stepped axial bore and first pressure line 10, and second communication port 64 connected to second communicating line 13 for intercommunicating the stepped axial bore and second pressure line 11, (ii) first poppet 51 slidably disposed in small-diameter bore 53a of stepped axial bore (53a, 53b), (iii) second poppet 52 slidably disposed in large-diameter bore 53b of stepped axial bore (53a, 53b), and having a second axial bore, namely a stepped axial bore (first and second communication bores 60 and 61), and formed at one axial end with first poppet valve seat 52a on which first poppet 51 seats to shut off the stepped axial bore (60, 61), and also formed at the one axial end with a pressure-receiving portion to which the hydraulic pressure, supplied through first and second pressure lines 10 and 11, first and second communicating lines 12 and 13, and first and second communication ports 63 and 64, is applied, and formed at the other axial end with a second poppet valve portion, (iv) a second poppet valve seat 54 (press-fitted to large-diameter bore 53b) on which second poppet 52 seats to block fluid communication between reservoir 5 and each of first and second pressure lines 10 and 11, (v) second spring 57 permanently biasing second poppet 52 in one axial direction, and (vi) the electromagnetic solenoid unit (50, 55) comprised of armature 50 fixedly connected to first poppet 51 and coil 55 creating an attracting force that produces the opposite axial movement of the armature fixed to first poppet 51 by switching coil 55 from the de-energized state to the energized state. At the initial stage of switching to the de-energized state of coil 55, first of all, only the first poppet 51 is forced off its seat and thus the first poppet valve is opened. Therefore, the hydraulic pressure in each of first and second pressure lines 10 and 11 is gradually relieved to reservoir 5 through the stepped axial bore (60, 61) formed in second poppet 52, thus avoiding a rapid pressure drop in hydraulic pressure P, in other words, a rapid change (a rapid drop) in steering assistance force. Thereafter, when hydraulic pressure P further falls and reaches predetermined hydraulic pressure value $P_0$, the hydraulic pressure (substantially corresponding to the pressure force Fp2) acting on the pressure-receiving portion of second poppet 52 further drops. Pressure force Fp2 acting on second poppet 52 is overcome by the spring bias Fk2 of second spring 57 and as a result second poppet 52 is forced off its seat and thus the second poppet valve is also opened. As a result of this, each of first and second communicating lines 12 and 13 is directly communicated with reservoir 5 not through the stepped axial bore (60, 61) of second poppet 52. This enables the hydraulic pressure P to be smoothly relieved from each of first and second pressure lines 10 and 11 to the reservoir, thereby preventing the hydraulic pressure from prevailing or remaining in each of first and second pressure lines 10 and 11. Therefore, it is possible to prevent the driver's steering effort from undesirably increasing owing to the remaining hydraulic pressure during the manual steering mode.

(5) The stepped axial bore (60, 61) formed in second poppet 52 includes first communication bore 60 having the relatively smaller effective cross-sectional area As1 and serving as an orifice constriction that prevents a rapid change in hydraulic pressure. The fixed orifice (first communication bore 60) ensures smooth pressure-relieving action for hydraulic pressure P in the communicating circuit (12, 13).

(6) The solenoid unit (50, 55, 58) operates to hold first poppet valve 51 at its closed position in the energized state (with coil 55 energized), and operates to hold first poppet valve 51 at its open position in the de-energized state (with coil 55 de-energized). Thus, in presence of the power steering system failure, such as a reversible pump failure, a motor failure, a steering torque sensor failure, and an ECU failure (including a signal line failure or the like), it is possible certainly to establish fluid communication between reservoir 5 and each of first and second pressure lines 10 and 11 by de-energizing coil 55 of the solenoid unit, thus ensuring the manual steering mode.

(7) First check valve 7 is fluidly disposed in first communicating line 12 of the communicating circuit (12, 13) for permitting only the working-fluid flow from first pressure line 10 to directional control valve 6, whereas second check valve 8 is fluidly disposed in second communicating line 13 of the communicating circuit (12, 13) for permitting only the working-fluid flow from second pressure line 11 to directional control valve 6. By virtue of these check valves (7, 8), it is possible to prevent first and second pressure lines 10 and 11 from being communicated with each other during the normal power steering mode (or during the normal power-assist control mode).

The entire contents of Japanese Patent Application No. 2004-063287 (filed Mar. 8, 2004) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A hydraulic power steering system comprising:
   a steering mechanism adapted to be connected to steered road wheels;
   a hydraulic power cylinder accommodating therein a piston connected to the steering mechanism for steering assistance, and having first and second hydraulic chambers defined on both sides of the piston;
   a reversible pump having a pair of discharge ports;
   a first fluid line intercommunicating the first hydraulic chamber and a first one of the discharge ports of the pump;
   a second fluid line intercommunicating the second hydraulic chamber and the second discharge port;
   a torque sensor that detects a steering torque applied to the steering mechanism;
   a motor that drives the pump;
   a motor control circuit that controls the motor responsively to a command signal determined based on the steering torque detected;
   a communicating circuit through which the first and second fluid lines are communicated with each other;
   a directional control valve disposed in the communicating circuit and having a poppet valve mechanism, said mechanism comprising two axially arranged poppet valves; and
   a valve control circuit that opens the directional control valve in presence of a hydraulic power steering system failure including at least one of a motor failure, a reversible pump failure, an ECU failure, and a torque sensor failure, to intercommunicate the first and second fluid lines with the directional control valve opened.

2. The hydraulic power steering system as claimed in claim 1, further comprising:
   a first check valve disposed in the communicating circuit for permitting only a working-fluid flow from the first fluid line to the directional control valve; and
   a second check valve disposed in the communicating circuit for permitting only a working-fluid flow from the second fluid line to the directional control valve.

3. A hydraulic power steering system comprising:
   a steering mechanism adapted to be connected to steered road wheels;
   a hydraulic power cylinder accommodating therein a piston connected to the steering mechanism for steering assistance, and having first and second hydraulic chambers defined on both sides of the piston;
   a reversible pump having a pair of discharge ports;
   a first fluid line intercommunicating the first hydraulic chamber and a first one of the discharge ports of the pump;
   a second fluid line intercommunicating the second hydraulic chamber and the second discharge port;
   a torque sensor that detects a steering torque applied to the steering mechanism;
   a motor that drives the pump;
   a motor control circuit that controls the motor responsively to a command signal determined based on the steering torque detected;
   a communicating circuit through which the first and second fluid lines are communicated with each other;
   a directional control valve disposed in the communicating circuit and having a poppet valve mechanism; and
   a valve control circuit that opens the directional control valve in presence of a hydraulic power steering system failure including at least one of a motor failure, a reversible pump failure, an ECU failure, and a torque sensor failure, to intercommunicate the first and second fluid lines with the directional control valve opened, wherein:
   the directional control valve is operated in response to a hydraulic pressure applied to the directional control valve, so that an opening area of the directional control valve increases, as the applied hydraulic pressure reduces.

4. A hydraulic power steering system comprising:
   a steering mechanism adapted to be connected to steered road wheels;
   a hydraulic power cylinder accommodating therein a piston connected to the steering mechanism for steering assistance, and having first and second hydraulic chambers defined on both sides of the piston;
   a reversible pump having a pair of discharge ports;
   a first fluid line intercommunicating the first hydraulic chamber and a first one of the discharge ports of the pump;
   a second fluid line intercommunicating the second hydraulic chamber and the second discharge port;
   a torque sensor that detects a steering torque applied to the steering mechanism;
   a motor that drives the pump;
   a motor control circuit that controls the motor responsively to a command signal determined based on the steering torque detected;
   a communicating circuit through which the first and second fluid lines are communicated with each other;
   a directional control valve disposed in the communicating circuit and having a poppet valve mechanism; and
   a valve control circuit that opens the directional control valve in presence of a hydraulic power steering system failure including at least one of a motor failure, a reversible pump failure, an ECU failure, and a torque sensor failure, to intercommunicate the first and second fluid lines with the directional control valve opened, wherein:
   the directional control valve is connected to each of a first communicating line constructing a part of the communicating circuit and connected to the first fluid line, a second communicating line constructing the remainder of the communicating circuit and connected to the second fluid line, and a reservoir.

5. The hydraulic power steering system as claimed in claim 4, wherein: the directional control valve comprises:
   (i) a valve housing having a first axial bore communicating the reservoir, a first communication port connected to the first communicating line for intercommunicating the first axial bore and the first fluid line, and a second communication port connected to the second communicating line for intercommunicating the first axial bore and the second fluid line;
   (ii) a first poppet slidably disposed in the first axial bore;
   (iii) a second poppet slidably disposed in the first axial bore, and having a second axial bore opened at both axial ends, and formed at a first axial end with a first poppet valve seat on which the first poppet seats to shut off the second axial bore, and formed at the first axial end with a pressure-receiving portion to which a hydraulic pressure, supplied through the first and second fluid lines, the first and second communicating lines, and the first and second communication ports, is applied, and formed at the second axial end with a second poppet valve portion;

(iv) a second poppet valve seat, which is press-fitted to the first axial bore and on which the second poppet seats to block fluid communication between the reservoir and each of the first and second fluid lines;

(v) a return spring permanently biasing the second poppet in one axial direction; and (vi) an electromagnetic solenoid unit including an armature fixedly connected to the first poppet and a coil creating an attracting force that produces the opposite axial movement of the armature fixed to the first poppet by switching the coil from a de-energized state to an energized state.

6. The hydraulic power steering system as claimed in claim 5, wherein:

the second axial bore formed in the second poppet has an orifice constriction.

7. The hydraulic power steering system as claimed in claim 5, wherein:

the solenoid unit holds the first poppet at a closed position in the energized state of the coil, and holds the first poppet at an open position in the de-energized state of the coil.

8. A hydraulic power steering system comprising:

a steering mechanism adapted to be connected to steered road wheels;

a hydraulic power cylinder accommodating therein a piston connected to the steering mechanism for steering assistance, and having first and second hydraulic chambers defined on both sides of the piston;

a reversible pump having a pair of discharge ports;

a first fluid line intercommunicating the first hydraulic chamber and a first one of the discharge ports of the pump;

a second fluid line intercommunicating the second hydraulic chamber and the second discharge port;

a motor that drives the pump;

a motor control circuit that controls the motor;

a communicating circuit through which the first and second fluid lines are communicated with each other;

a directional control valve disposed in the communicating circuit, and having a poppet valve mechanism and an electromagnetic solenoid unit connected to the poppet valve mechanism, said mechanism comprising two axially arranged poppet valves; and a valve control circuit that outputs a valve-opening signal to the solenoid unit for operating the directional control valve in a direction of opening of the directional control valve in presence of a hydraulic power steering system failure including at least one of a motor failure and a reversible pump failure.

9. The hydraulic power steering system as claimed in claim 8, further comprising:

a first check valve disposed in the communicating circuit for permitting only a working-fluid flow from the first fluid line to the directional control valve; and a second check valve disposed in the communicating circuit for permitting only a working-fluid flow from the second fluid line to the directional control valve.

10. A hydraulic power steering system comprising:

a steering mechanism adapted to be connected to steered road wheels;

a hydraulic power cylinder accommodating therein a piston connected to the steering mechanism for steering assistance, and having first and second hydraulic chambers defined on both sides of the piston;

a reversible pump having a pair of discharge ports;

a first fluid line intercommunicating the first hydraulic chamber and a first one of the discharge ports of the pump;

a second fluid line intercommunicating the second hydraulic chamber and the second discharge port;

a motor that drives the pump;

a motor control circuit that controls the motor;

a communicating circuit through which the first and second fluid lines are communicated with each other;

a directional control valve disposed in the communicating circuit, and having a poppet valve mechanism and an electromagnetic solenoid unit connected to the poppet valve mechanism; and a valve control circuit that outputs a valve-opening signal to the solenoid unit for operating the directional control valve in a direction of opening of the directional control valve in presence of a hydraulic power steering system failure including at least one of a motor failure and a reversible pump failure, wherein:

the directional control valve is operated in response to a hydraulic pressure applied to the directional control valve, so that an opening area of the directional control valve increases, as the applied hydraulic pressure reduces.

11. A hydraulic power steering system comprising:

a steering mechanism adapted to be connected to steered road wheels;

a hydraulic power cylinder accommodating therein a piston connected to the steering mechanism for steering assistance, and having first and second hydraulic chambers defined on both sides of the piston;

a reversible pump having a pair of discharge ports;

a first fluid line intercommunicating the first hydraulic chamber and a first one of the discharge ports of the pump;

a second fluid line intercommunicating the second hydraulic chamber and the second discharge port;

a motor that drives the pump;

a motor control circuit that controls the motor;

a communicating circuit through which the first and second fluid lines are communicated with each other;

a directional control valve disposed in the communicating circuit, and having a poppet valve mechanism and an electromagnetic solenoid unit connected to the poppet valve mechanism; and a valve control circuit that outputs a valve-opening signal to the solenoid unit for operating the directional control valve in a direction of opening of the directional control valve in presence of a hydraulic power steering system failure including at least one of a motor failure and a reversible pump failure, wherein:

the directional control valve is connected to each of a first communicating line constructing a part of the communicating circuit and connected to the first fluid line, a second communicating line constructing the remainder of the communicating circuit and connected to the second fluid line, and a reservoir.

12. The hydraulic power steering system as claimed in claim 11, wherein:

the directional control valve comprises:

(i) a valve housing having a first axial bore communicating the reservoir, a first communication port connected to the first communicating line for intercommunicating the first axial bore and the first fluid line, and a second communication port connected to the second communicating line for intercommunicating the first axial bore and the second fluid line;

(ii) a first poppet slidably disposed in the first axial bore;

(iii) a second poppet slidably disposed in the first axial bore, and having a second axial bore opened at both axial ends, and formed at a first axial end with a first poppet valve seat on which the first poppet seats to shut off the second axial bore, and formed at the one axial end with a pressure-receiving portion to which a hydraulic pressure, supplied through the first and second fluid lines, the first and second communicating lines, and the first and second communication ports, is applied, and formed at the second axial end with a second poppet valve portion;

(iv) a second poppet valve seat, which is press-fitted to the first axial bore and on which the second poppet seats to block fluid communication between the reservoir and each of the first and second fluid lines;

(v) a return spring permanently biasing the second poppet in one axial direction; and (vi) the electromagnetic solenoid unit including an armature fixedly connected to the first poppet and a coil creating an attracting force that produces the opposite axial movement of the armature fixed to the first poppet by switching the coil from a de-energized state to an energized state.

13. The hydraulic power steering system as claimed in claim 12, wherein:
the second axial bore formed in the second poppet has an orifice constriction.

14. The hydraulic power steering system as claimed in claim 12, wherein:
the solenoid unit holds the first poppet at a closed position in the energized state of the coil, and holds the first poppet at an open position in the de-energized state of the coil.

15. A hydraulic power steering system comprising:
a steering mechanism adapted to be connected to steered road wheels;
a hydraulic power cylinder accommodating therein a piston connected to the steering mechanism for steering assistance, and having first and second hydraulic chambers defined on both sides of the piston;
a reversible pump having a pair of discharge ports;
a first fluid line intercommunicating the first hydraulic chamber and a first one of the discharge ports of the pump;
a second fluid line intercommunicating the second hydraulic chamber and the second discharge port;
sensor means for detecting a steering torque applied to the steering mechanism;
a motor that drives the pump;
motor control means for controlling the motor responsively to a command signal determined based on the steering torque detected;
a communicating circuit through which the first and second fluid lines are communicated with each other;
directional control valve means disposed in the communicating circuit and having at least a poppet valve mechanism, said mechanism comprising two axially arranged poppet valves; and
valve control means for holding the poppet valve mechanism unseated and opened in presence of a hydraulic power steering system failure including at least one of a motor failure and a reversible pump failure, to establish fluid communication between the first and second fluid lines, and for holding the poppet valve mechanism seated and closed in absence of the hydraulic power steering system failure, to block fluid communication between the first and second fluid lines.

16. The hydraulic power steering system as claimed in claim 15, wherein:
the directional control valve means further comprises a first check valve disposed in the communicating circuit for permitting only a working-fluid flow from the first fluid line to the poppet valve mechanism, and a second check valve disposed in the communicating circuit for permitting only a working-fluid flow from the second fluid line to the poppet valve mechanism.

17. A hydraulic power steering system comprising:
a steering mechanism adapted to be connected to steered road wheels;
a hydraulic power cylinder accommodating therein a piston connected to the steering mechanism for steering assistance, and having first and second hydraulic chambers defined on both sides of the piston;
a reversible pump having a pair of discharge ports;
a first fluid line intercommunicating the first hydraulic chamber and a first one of the discharge ports of the pump;
a second fluid line intercommunicating the second hydraulic chamber and the second discharge port;
sensor means for detecting a steering torque applied to the steering mechanism;
a motor that drives the pump;
motor control means for controlling the motor responsively to a command signal determined based on the steering torque detected;
a communicating circuit through which the first and second fluid lines are communicated with each other;
directional control valve means disposed in the communicating circuit and having at least a poppet valve mechanism; and
valve control means for holding the poppet valve mechanism unseated and opened in presence of a hydraulic power steering system failure including at least one of a motor failure and a reversible pump failure, to establish fluid communication between the first and second fluid lines, and for holding the poppet valve mechanism seated and closed in absence of the hydraulic power steering system failure, to block fluid communication between the first and second fluid lines,
wherein the directional control valve means further comprises a first check valve disposed in the communicating circuit for permitting only a working-fluid flow from the first fluid line to the poppet valve mechanism, and a second check valve disposed in the communicating circuit for permitting only a working-fluid flow from the second fluid line to the poppet valve mechanism, and
wherein: the poppet valve mechanism has a drain port communicating a reservoir, a first communication port connected to an outlet port of the first check valve, and a second communication port connected to an outlet port of the second check valve;
the valve control means holds the poppet valve mechanism unseated and opened in presence of the hydraulic power steering system failure, for establishing fluid communication between the first and second fluid lines by relieving a hydraulic pressure, charged in a bypass circuit defined between the first communication port and the outlet port of the first check valve and between the second communication port and the outlet port of the second check valve, via the drain port to the reservoir.

18. The hydraulic power steering system as claimed in claim 17, wherein:

the valve control means holds the poppet valve mechanism seated and closed in absence of the hydraulic power steering system failure, for blocking fluid communication between the first and second fluid lines by holding the hydraulic pressure, charged in the bypass circuit, at a pressure value substantially corresponding to a pressure level of working fluid in the first and second fluid lines.

19. The hydraulic power steering system as claimed in claim 18, wherein:

the poppet valve mechanism is operated in response to the hydraulic pressure, charged in the bypass circuit, so that an opening area of the poppet valve mechanism increases, as the hydraulic pressure reduces.

20. The hydraulic power steering system as claimed in claim 19, wherein:

the poppet valve mechanism has a double poppet valve structure, the double poppet valve structure comprising:

a valve housing having a first axial bore, the drain port and the first and second communication ports;

a first spring-offset solenoid-actuated poppet slidably disposed in the first axial bore; an axial movement of the first poppet being determined based on a summed force of a solenoid attracting force, a pressure force acting on the first poppet by a pressure differential between the hydraulic pressure charged in the bypass circuit and a hydraulic pressure in the drain port, and a first return spring reaction force; and a second poppet slidably disposed in the first axial bore and axially aligned with the first poppet and having a second axial bore opened at both axial ends, and formed at a first axial end with a first poppet valve seat on which the first poppet seats to shut off a first opening end of the second axial bore, and formed at the first axial end with a pressure-receiving portion to which the hydraulic pressure, charged in the bypass circuit, is applied, and formed at the second axial end with a second poppet valve portion having the second opening end of the second axial bore communicating the drain port; an axial movement of the second poppet being determined based on a summed force of an axial force applied from the first poppet to the second poppet, a pressure force acting on the second poppet by the pressure differential between the hydraulic pressure charged in the bypass circuit and the hydraulic pressure in the drain port, and a second return spring reaction force.

21. The hydraulic power steering system as claimed in claim 20, wherein:

the second axial bore formed in the second poppet has an orifice constriction having a relatively smaller effective cross-sectional area than an effective cross-sectional area of the drain port.

22. The hydraulic power steering system as claimed in claim 21, wherein:

the first poppet is switched from a closed position to an open position at a first switching point when switching from a solenoid energized state to a solenoid de-energized state occurs in presence of the hydraulic power steering system failure and a pressure drop in the hydraulic pressure charged in the bypass circuit starts; and the second poppet is switched from a closed position to an open position at a second switching point when the hydraulic pressure charged in the bypass circuit reduces to below a predetermined hydraulic pressure value with a time lag from the first switching point.

* * * * *